(12) United States Patent
Sang et al.

(10) Patent No.: US 11,474,758 B2
(45) Date of Patent: Oct. 18, 2022

(54) INTELLIGENT SEAL WITH CLOUD COMPUTING-BASED ANTI-FORGERY CAPABILITY, ENABLES PRINTING THE SEAL WITH DEGREE ROTATION WHICH IMPROVING PRINTING SPEED AND EFFICIENCY

(71) Applicant: HAIMING UNITED ENERGY GROUP JUWANG TECHNOLOGY CO., LTD., Tangshan (CN)

(72) Inventors: Haiming Sang, Tangshan (CN); Ge Gan, Tangshan (CN); Song Li, Tangshan (CN)

(73) Assignee: HAIMING UNITED ENERGY GROUP JUWANG TECHNOLOGY CO., LTD., Tangshan (CN)

( * ) Notice: Subject to any disclaimer, the term of this patent is extended or adjusted under 35 U.S.C. 154(b) by 14 days.

(21) Appl. No.: 17/009,017

(22) Filed: Sep. 1, 2020

(65) Prior Publication Data

US 2021/0191671 A1 Jun. 24, 2021

(30) Foreign Application Priority Data

Jul. 2, 2019 (CN) .......................... 201910588690.X

(51) Int. Cl.
*G06F 3/12* (2006.01)
*G06F 21/32* (2013.01)
(Continued)

(52) U.S. Cl.
CPC .......... *G06F 3/1222* (2013.01); *G06F 3/1238* (2013.01); *G06F 3/1243* (2013.01);
(Continued)

(58) Field of Classification Search
None
See application file for complete search history.

(56) References Cited

U.S. PATENT DOCUMENTS

| 6,930,803 B1 * | 8/2005 | Suzuki ................. G06T 1/0021 358/448 |
| 2007/0211294 A1 * | 9/2007 | Tsuchitoi ............... G06K 15/02 358/1.18 |

(Continued)

FOREIGN PATENT DOCUMENTS

| CN | 108830502 A | 11/2018 |
| CN | 109685179 A | 4/2019 |

(Continued)

OTHER PUBLICATIONS

Machine Translation in English of Chinese Pub/Patent 108830502 to Long Long.*

(Continued)

*Primary Examiner* — Haris Sabah
(74) *Attorney, Agent, or Firm* — McClure, Qualey & Rodack, LLP

(57) ABSTRACT

An intelligent seal with cloud computing-based anti-forgery capability and a method for using the same. In various embodiments, the seal is provided with a special-shaped anti-forgery mark. All data files and log files are stored collectively at a seal management cloud platform, thereby achieving anti-forgery through cloud computing at the cloud platform, preventing theft and tampering of user data and seal data, allowing real-time query of seal usage information, and enabling third-party verification and anti-forgery of the seal information.

37 Claims, 8 Drawing Sheets

(51) Int. Cl.
  *G06F 21/60* (2013.01)
  *G06K 7/14* (2006.01)
  *G06Q 10/10* (2012.01)
  *G06Q 30/00* (2012.01)
  *G06Q 50/18* (2012.01)
  *G06V 40/12* (2022.01)

(52) U.S. Cl.
  CPC ............ *G06F 3/1292* (2013.01); *G06F 21/32* (2013.01); *G06F 21/608* (2013.01); *G06K 7/1421* (2013.01); *G06Q 10/103* (2013.01); *G06Q 10/105* (2013.01); *G06Q 30/0185* (2013.01); *G06Q 50/18* (2013.01); *G06V 40/12* (2022.01)

(56) References Cited

U.S. PATENT DOCUMENTS

2008/0151279 A1* 6/2008 Yamada ................ G06F 3/1284
  358/1.9
2011/0051173 A1* 3/2011 Yagishita ............... G06K 15/02
  358/1.14
2013/0268624 A1* 10/2013 Yagiura .................. H04L 67/10
  709/217

FOREIGN PATENT DOCUMENTS

CN        109754045 A      5/2019
JP        2005077631   *   3/2005

OTHER PUBLICATIONS

Machine Translation in English of Chinese Pub/Patent 109685179 to Chen Jing.*
Machine Translation in English of Chinese Pub/Patent 109754045 to Sang Haiming.*
Machine Translation in English of Japanese Pub 2005-077631 to Katamoto.*
First Office Action dated Nov. 29, 2019 in corresponding Chinese Patent Application No. 201910588690.X, 2 pages.

* cited by examiner

INTELLIGENT SEAL WITH CLOUD COMPUTING-BASED ANTI-FORGERY CAPABILITY, ENABLES PRINTING THE SEAL WITH DEGREE ROTATION WHICH IMPROVING PRINTING SPEED AND EFFICIENCY

CROSS-REFERENCE TO RELATED APPLICATIONS

This application claims priority to Chinese Patent Application No. 201910588690.X, filed on 2 Jul. 2019, which is hereby incorporated by reference in its entirety.

TECHNICAL FIELD

The present disclosure relates to an anti-forgery technology for official seals, and in particular to an intelligent seal with cloud computing-based anti-forgery capability and a method for using the same.

BACKGROUND

An official seal is a seal used by a legal person in dealing with internal and external affairs; a document becomes authenticated only when it is stamped with the official seal. However, society have long faced problems such as using the official seal without authorization and fake seals. Because the official seal creates almost identical impressions on documents, the impressions cannot be directly distinguished and the documents cannot be verified based on the impressions. Therefore, loopholes, fake seals and using the official seal without authorization occur frequently; it is difficult to identify the authenticity of a document stamped with an official seal.

One existing technology is a method that prints an anti-forgery seal with a two-dimensional code by a printer. This seal includes a two-dimensional code for information extraction, which can be used to trace the source of the seal, enabling anti-forgery to a certain extent; but such anti-forgery seal printing apparatus in use may have the following problems.

1. The existing technology requires, before printing the seal, in-person approval of a stamping application by the leadership. This approval process can take a long time, which is especially detrimental in contract signing, where opportunity is fleeting. Delays due to the stamping process may cause irreparable harm to the company.

2. The existing technology mostly requires a keyboard or touchscreen on the printer for entering a verification code, or selecting seal information or controlling a printing function; as a result, the printer is provided with an additional input device and its supporting circuitry, which increases the size and power consumption of the printer, to the extent that the printer can no longer be powered with a battery, or can only work for a short amount of time on battery. In addition, authentication based on passwords or smart cards is vulnerable to password leak and smart card theft.

3. The anti-forgery code used in the existing technology is generally a two-dimensional code in the middle of the seal, which is not good for aesthetics and may cause interference between the two-dimensional code and letters in the document, obscuring the letters in the document or reducing the readability of the two-dimensional code. More importantly, the two-dimensional code is encoded with an open coding system. Anyone can purchase a code scanner to read the information, which may cause information leakage, or worse, they can forge a two-dimensional code or tamper with the content of the two-dimensional code by a two-dimensional code generator, which will abolish the anti-forgery function of the two-dimensional code.

4. The existing technology generally uses a conventional inkjet printer to print the seal, mostly in a conventional, parallel way, that is, the printhead moves in the plane along the two axes perpendicular to each other. This way of printing requires multiple trips back and forth, which is time-consuming, energy-consuming and inefficient. Moreover, the irregular structure of the existing ink cartridge affects the size of the printer, making the printer large and bulky. In addition, due to the conventional structure of the printer, the parallel way of printing has a problem that the outer edge of the printed circle is not round enough, because when the printhead moves perpendicularly on the surface of a paper, it leaves a visible error between its previous and current travels, i.e., a step-like pattern.

5. The existing technology generally uses a printer built-in memory chip to pre-store seal information; when in use, the printing function is activated by password authentication or the like, and stored information data is invoked. However, storing seal data in a seal internal memory chip is vulnerable to cracking by hackers, which may lead to seal data tampering or theft and cause seal tempering or seal theft.

6. The existing technology mostly uses a printer to print the seal, which is inconvenient because of the large size and lack of portability of the printer, and because it requires the contract to be placed in a designated place in the printer.

7. The portable printers in the existing technology have a problem that the coverage of the printer nozzle only accounts for a portion of the cross-section of the printer, therefore, during printing, the specific location of the printer nozzle cannot be seen, and it would be difficult to accurately estimate the specific location of the printed seal.

SUMMARY OF PARTICULAR EMBODIMENTS

In view of the above technical problems, the present disclosure provides an intelligent seal with cloud computing-based anti-forgery capability and a method for using the same, specifically, including the following means:

1. According to an embodiment of the present disclosure, a special method for using the seal is designed, in which a level-by-level seal approval process is completed before using the seal, so that the user can conduct the approval process on a mobile app before signing; when it is time to sign, the user directly activates a printing operation by a fingerprint recognition device, which makes the whole signing process smooth.

2. An embodiment of the present disclosure provides a mobile app. The mobile app has a function interface for printer control, including password authentication, seal type selection, copy quantity selection, etc. Therefore, the printer itself does not need a keyboard or touchscreen, greatly increasing the size and power consumption of the printer.

3. According to an embodiment of the present disclosure, a specially designed anti-forgery code is used, specifically, the anti-forgery code is an image anti-forgery code on the outer edge of a circular, oval or rectangle seal. The image anti-forgery code may be closed-looped, consisting of a plurality of vertical bars of different widths and spacings arranged in a ring structure; therefore, the image anti-forgery code does not change the overall layout of the original seal and does not stand out. In addition, the image anti-forgery code does not obscure the letters of a contract like a two-dimensional code in the existing technology, complying with seal using norms. The anti-forgery code of the present disclosure has a layout, shape and encoding method originally created by the applicant, in contrast to an open coding system; therefore, individuals without knowledge of the encoding method cannot read the code, and certainly cannot forge it or tamper with it.

4. An embodiment of the present disclosure provides a special-purpose rotational-printing integrated ink cartridge for printing the seal, including a cartridge and a nozzle on the cartridge body. The cartridge and nozzle can be used for not only parallel printing, but also rotational printing of the seal, including special patterns such as circular seal, oval seal or rectangle seal. The cartridge can complete the printing of a seal with a mere 180° or 360° rotation, which improves printing speed and efficiency.

Additionally, the ink cartridge may have a circular or oval shape, and the entire printing apparatus may have a regular shape that fits the ink cartridge design, e.g., a cylindrical shape or an ellipsoidal shape. The shape of the ink cartridge makes the entire printing apparatus more compact and portable, and enables the printing of the seal.

5. An embodiment of the present disclosure provides a seal management cloud platform for collectively storing various seal, user and company data, which generates corresponding seal information in response to a user request and transmits it to a seal for printing, i.e., all data storage, user authentication and seal information generation steps are done at the seal management platform. The seal itself receives seal image information transmitted from the seal management platform and prints, without storing any seal, user or company data. The seal management platform may be a unified cloud platform. This centralized management approach can ensure data security to the greatest extent, and prevent data tampering and theft.

6. An embodiment of the present disclosure provides a special-purpose portable seal with printing function. The portable seal is independently developed by the applicant and its detailed structure will be described in other patent application of the applicant. The portable seal has a size similar to that of traditional seals; and to use the seal, one simply puts the seal at a stamping location and activates the printing function. The usage of the seal is similar to that of traditional seals, bringing great convenience.

7. An embodiment of the present disclosure provides an additional laser pointer module, for indicating a stamping location for the seal, which corresponds to the location of the printer nozzle. The laser pointer module includes a laser head positioned at an angle with the paper, so that the farther away the portable seal is from the paper, the larger the box formed by the light is, and that the closer the portable seal is to the paper, the smaller the box formed by the light is. Therefore, with the laser pointer module, the location of the printed seal can be accurately estimated, overcoming the drawback of the printers in the existing technology that the location of the printed seal cannot be accurately estimated.

Specifically, the present disclosure provides the following technical solutions:

An intelligent seal with cloud computing-based anti-forgery capability and a method for using the same, for printing a seal with an anti-forgery mark, comprising a portable seal, a mobile terminal and a seal management platform:

The seal management platform is a cloud platform, including:

(1) a user data management module, for user registration, managing and storing a user information database, user identity authentication by comparison with the user information database, storing predetermined user approval authority, and assisting user in approving a seal using application by using the predetermined user approval authority;

(2) a seal image generation module, for generating a seal image and transmitting it to the portable seal for printing in response to a seal using application, where the seal image is an anti-forgery seal with an anti-forgery code;

(3) a seal usage data storage module, for storing all seal using application, seal using approval and related time information generated in seal using processes, storing image data of the stamped document captured and uploaded by user. In an embodiment of the present disclosure, all seal usage data is stored at this module, and no such data is stored at the seal or the mobile terminal.

(4) an anti-forgery information retrieval module, for retrieving seal anti-forgery information through cloud computing by using data obtained by the mobile terminal from scanning the seal anti-forgery code, and displaying the seal anti-forgery information via the mobile terminal. This module is mainly used for the anti-forgery function of the seal, i.e., comparing the obtained anti-forgery information with such information as seal content, file content and related time records, and verifying the seal;

(5) an information retrieval module, for displaying a specific part or all the content of the stamped document image generated in step (3) in response to a user seal information retrieval request according to different privilege levels of the users. For example, if a user has a high privilege level, he/she can view all the content of the stamped document; if the user has a low privilege level, he/she can only view name information of the contracting parties.

The portable seal includes:

(1) a fingerprint verification module, for collecting user fingerprint information during new user registration, and uploading the user fingerprint information to the seal management platform for storage and management; and when a seal using application have been approved, verifying a fingerprint and activating a printing module of the portable seal to print. This is equivalently an integrated device for both fingerprint verification and printing switch. Specifically, once a seal using application is approved, when it is time to stamp a seal, the portable seal is placed at a designated location for stamping, and the fingerprint verification module is touched; then, the verification module transmits user fingerprint information to the seal management platform for verification, and the seal management platform returns a message indicating whether verification is passed to the portable seal; upon receipt of the message indicating verification is passed, the portable seal starts printing.

(2) a data transmission module, for data transmission between the portable seal and the mobile terminal;

(3) a printing module, for printing the seal, the printing module including a rotational-printing integrated ink cartridge suitable for printing a circular seal, where the integrated ink cartridge includes a cartridge body and a printer nozzle on the cartridge body, the cartridge rotates about its own axis to realize the printing of the seal. The cartridge may have a cross-sectional shape in accordance with the outer contour of the portable stamp, so that the internal space of the stamp is fully utilized. Preferably, the cartridge has a cylindrical shape.

The mobile terminal includes:

(1) a built-in seal management program, for providing an interface for new user registration, and uploading user identity information and company business information to the seal management platform; and for providing an interface to users of different levels for filing or approving a seal using application. In the embodiment of the present disclosure, the mobile terminal is connected to the portable seal and the seal management platform, and provides an interface for user input and control through the seal management platform for user registration, and provides seal printing control functions.

(2) a scanner, for scanning a seal with an anti-forgery code, and uploading scanned data to the seal management platform, which computes and obtains seal anti-forgery information. That is, seal information stored at the platform is obtained by scanning the anti-forgery code, and then compared with the stamped document on hand, thereby realizing the anti-forgery function.

Furthermore, the anti-forgery code is an image anti-forgery code on the entire outer edge of a seal, forming a closed loop.

Furthermore, the anti-forgery code is an image anti-forgery code on a portion of the outer edge of a seal, forming an unclosed loop.

Furthermore, the anti-forgery code consists of a plurality of vertical bars of different widths and spacings arranged in a ring structure.

Furthermore, the seal with an anti-forgery code is a circular.

Furthermore, the seal with an anti-forgery code is oval or rectangle.

Furthermore, the portable seal further comprises a laser pointer module, for indicating a stamping location for the seal, which corresponds to the location of the printer nozzle;

the laser pointer module comprises a laser head positioned at an angle with the paper, so that the farther away the portable seal is from the paper, the larger the box formed by the light is, and that the closer the portable seal is to the paper, the smaller the box formed by the light is.

Furthermore, the specific part of the stamped document is a document image with contract amount blurred out, or a document image of only names of the contracting parties and/or a contracting date.

Furthermore, the scanner is a camera with scanning capability.

Furthermore, the seal anti-forgery information displayed by the mobile terminal is information related to the seal using action, comprising: contract content, seal user, seal use approver, seal stamping time and seal stamping location; the seal anti-forgery information displayed by the mobile terminal is compared with the stamped document, to verify the seal and the stamped document.

Furthermore, the pattern of the seal anti-forgery code is calculated and obtained with an encryption and anti-forgery algorithm internal to the seal management platform.

Furthermore, the mobile terminal is any one or more of: mobile phone, PAD, PC, laptop and remote controller.

Furthermore, the printer nozzle is a thermal foam spray nozzle.

Furthermore, the printer nozzle uses a security anti-forgery ink.

Furthermore, the printing module further comprises a printer nozzle moisturizing and cleaning mechanism.

Furthermore, the printer nozzle moisturizing mechanism is a silicone pad, which is pressed against the nozzle when the nozzle is idle, so that the inside of the nozzle is insulated from the air to prevent the ink from solidifying.

Furthermore, the printer nozzle cleaning mechanism controls based on the power so that all of the injection holes simultaneously enter a maximum power injection state to achieve cleaning effect.

Furthermore, the seal management platform and the mobile terminal are connected via any one or more of: WiFi, Bluetooth, LAN and Coaxial cable; the mobile terminal and the portable seal are connected via any one or more of: WiFi, Bluetooth, LAN and Coaxial cable.

Accordingly, an embodiment of the present disclosure provides a method for using the seal printing apparatus, the method comprising the following steps in a sequential order:

step (1) inputting user information and company business information to the seal management platform by using a built-in seal management program on the mobile terminal or directly using a computer, to complete user registration after verification. The built-in seal management program provides a user registration interface, for the user to input information and complete registration on the seal management platform; as a matter of course, the user can directly log in to the seal management platform via a computer.

step (2) entering fingerprint information by using the fingerprint recognition module on the portable seal, and uploading the fingerprint information to the seal management platform. The purpose of this step is to input user fingerprint information, so that identity authentication can be performed for subsequent use of the seal. Both the fingerprint information collection during user registration and the fingerprint information verification during seal using use the fingerprint recognition module on the portable printer, i.e., the same device for inputting and verifying the fingerprint, thereby improving the accuracy and success rate of the fingerprint verification.

step (3) assigning, by the seal management platform according to a predetermined rule, administrator privileges to one or more users, such that the user with administrator privileges can set seal approval authority for other users of the same company. For example, the first user that creates the company account may be assigned with administrator privileges; and the user with administrator privileges can set respective seal approval authorities to other users of the company, e.g., setting an ordinary salesperson authority to A, setting a director authority to B and setting a general manager authority to C, then the seal using approval process is: A initiates an application—B approves—C approves—A is authorized to use the seal.

step (4) when it is time to stamp a seal, opening the seal management program, and initiating a seal using application after verification is passed, where the initiating a seal using application comprises filling in seal using-related information in the seal management program. The seal using-related information comprises names of the contracting parties, bank account, seal use, contract purpose, contract amount, contract summary and number of seal usage.

step (5) after the seal using application is initiated, approving, level-by-level, by users with different seal approval authorities preset by the administrator, the seal using application, by using the seal management program;

step (6) once the seal using application is approved, connecting the mobile terminal to the portable seal, and performing two-way data transmission between the mobile terminal and the portable seal. The data transmission between them is via a wireless connection, e.g., Bluetooth.

step (7) uploading fingerprint information collected by the fingerprint verification module on the portable seal to the seal management platform for verification, and automatically activating by the portable seal the printing function immediately after the verification is passed. The fingerprint verification module provides both the fingerprint verification function and the printing activation function. Therefore, by touching the fingerprint verification module once, the user prints the seal once; by touching the fingerprint verification module a number of times, the user prints the seal a corresponding number of times (the number of seal usage is determined in step (4).

step (8) after the seal is printed, capturing the stamped document by a camera on the mobile terminal, and uploading to the seal management platform, which stores the image information. The purpose of this step is to back up and store the stamped document.

Furthermore, the verification in step (1) comprises verification of company business information and identity for a legal representative, and the verification is done automatically at the seal management platform, e.g. by automatically connecting to the database of a commerce administrative authority, or by manual review.

Furthermore, the seal using-related information filled in step (4) comprises any one or more of: user account, names of contracting parties, seal use, contract amount, contract summary and number of seal usage.

Furthermore, the level-by-level approval in step (5) comprises: approving, by users according to their different seal approval authorities set by the administrator in step (3) from the one with the lowest authority to the one with the highest authority.

Furthermore, the method further comprises: after the fingerprint verification is passed in step (7) and before the portable seal prints the seal: transmitting, by the seal management platform, seal image information to be printed to the printer body.

Furthermore, after each one of steps (1) to (7), the seal management platform records a log file generated in the corresponding step, where the log file is an unchangeable file and records information related to the stamping process, including user and company registration information in respective steps, user fingerprint information, time information of the seal using application, approval process information and content of the stamped contract. The file becomes unchangeable by setting program protection, blocking its editing capability and the like.

Furthermore, the unchangeable log file is a real-time generated file, i.e., the unchangeable log file is generated immediately after an information item related to the stamping process is collected.

Furthermore, the captured document image in step (8) is stored to an unchangeable log file.

The anti-forgery seal printing apparatus and the method for using the same according to the embodiments of the present disclosure use an anti-forgery mark with a special shape, such that the seal with the anti-forgery mark is beautiful and clear without obscuring the letters in the document. The anti-forgery mark is generated by an algorithm exclusively developed by the applicant, could not be read without a software provided by the applicant, and certainly could not be tampered with, thereby ensuring data security. In addition, a seal management platform is used to collectively store all data files and log files, which prevents theft and tampering of user data and seal data. A mobile terminal is used to provide an interface for user information input and printer control, so that the printer itself does not need a keyboard for input; and a fingerprint verification module is used to activate printing, which greatly reduces the amount of parts in the portable seal, reduces the size of the portable seal and achieves true portability.

DETAILED DESCRIPTION OF PARTICULAR EMBODIMENTS

To make clearer the objects, technical solutions and advantages of the present disclosure, the technical solutions in the embodiments of the present disclosure will be described clearly and fully in conjunction with the accompany drawings. As a matter of course, the embodiments described herein are merely some exemplary embodiments of the present invention; any other embodiment obtained by those skilled in the art based on the embodiments herein without inventive effort shall fall within the scope of protection of the present invention.

Figure 1:
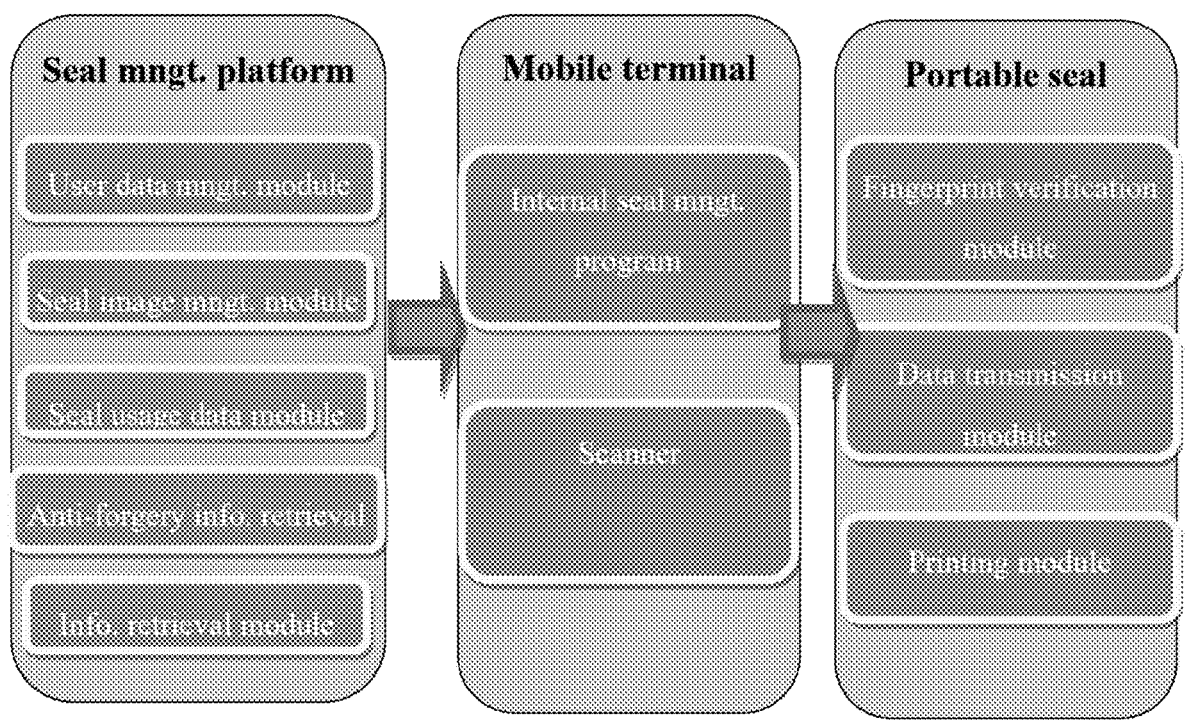
FIG. 1 is a block diagram of an anti-forgery seal printing apparatus according to an embodiment of the present disclosure.

FIG. 1 is a block diagram of a printing apparatus according to an embodiment of the present disclosure, where data connection is available between the seal management platform and the mobile terminal, and data connection is available between the mobile terminal and the portable printer.

The seal management platform is a cloud platform, including:

(1) a user data management module, for user registration, managing and storing a user information database, user identity authentication by comparison with the user information database, storing predetermined user approval authority, and assisting user in approving a seal using application by using the predetermined user approval authority;

(2) a seal image generation module, for generating a seal image and transmitting it to the portable seal for printing in response to a seal using application, where the seal image is an anti-forgery seal with an anti-forgery code;

(3) a seal usage data storage module, for storing all seal using application, seal using approval and related time information generated in seal using processes, storing image data of the stamped document captured and uploaded by user. In an embodiment of the present disclosure, all seal usage data is stored at this module, and no such data is stored at the seal or the mobile terminal.

(4) an anti-forgery information retrieval module, for retrieving seal anti-forgery information through cloud computing by using data obtained by the mobile terminal from scanning the seal anti-forgery code, and displaying the seal anti-forgery information via the mobile terminal. This module is mainly used for the anti-forgery function of the seal, i.e., comparing the obtained anti-forgery information with such information as seal content, file content and related time records, and verifying the seal;

(5) an information retrieval module, for displaying a specific part or all the content of the stamped document image generated in step (3) in response to a user seal information retrieval request according to different privilege levels of the users. For example, if a user has a high privilege level, he/she can view all the content of the stamped document; if the user has a low privilege level, he/she can only view name information of the contracting parties.

The portable seal includes:

(1) a fingerprint verification module, for collecting user fingerprint information during new user registration, and uploading the user fingerprint information to the seal management platform for storage and management; and when a seal using application have been approved, verifying a fingerprint and activating a printing module of the portable seal to print. This is equivalently an integrated device for both fingerprint verification and printing switch. Specifically, once a seal using application is approved, when it is time to stamp a seal, the portable seal is placed at a designated location for stamping, and the fingerprint verification module is touched; then, the verification module transmits user fingerprint information to the seal management platform for verification, and the seal management platform returns a message indicating whether verification is passed to the portable seal; upon receipt of the message indicating verification is passed, the portable seal starts printing.

(2) a data transmission module, for data transmission between the portable seal and the mobile terminal;

(3) a printing module, for printing the seal, the printing module including a rotational-printing integrated ink cartridge suitable for printing a circular seal, where the integrated ink cartridge includes a cartridge body and a printer nozzle on the cartridge body, the cartridge rotates about its own axis to realize the printing of the seal. The cartridge may have a cross-sectional shape in accordance with the outer contour of the portable stamp, so that the internal space of the stamp is fully utilized. Preferably, the cartridge has a cylindrical shape.

The mobile terminal includes:

(1) a built-in seal management program, for providing an interface for new user registration, and uploading user identity information and company business information to the seal management platform; and for providing an interface to users of different levels for filing or approving a seal using application. In the embodiment of the present disclosure, the mobile terminal is connected to the portable seal and the seal management platform, and provides an interface for user input and control through the seal management platform for user registration, and provides seal printing control functions.

(2) a scanner, for scanning a seal with an anti-forgery code, and uploading scanned data to the seal management platform, which computes and obtains seal anti-forgery information. That is, seal information stored at the platform is obtained by scanning the anti-forgery code, and then compared with the stamped document on hand, thereby realizing the anti-forgery function.

Figure 2:
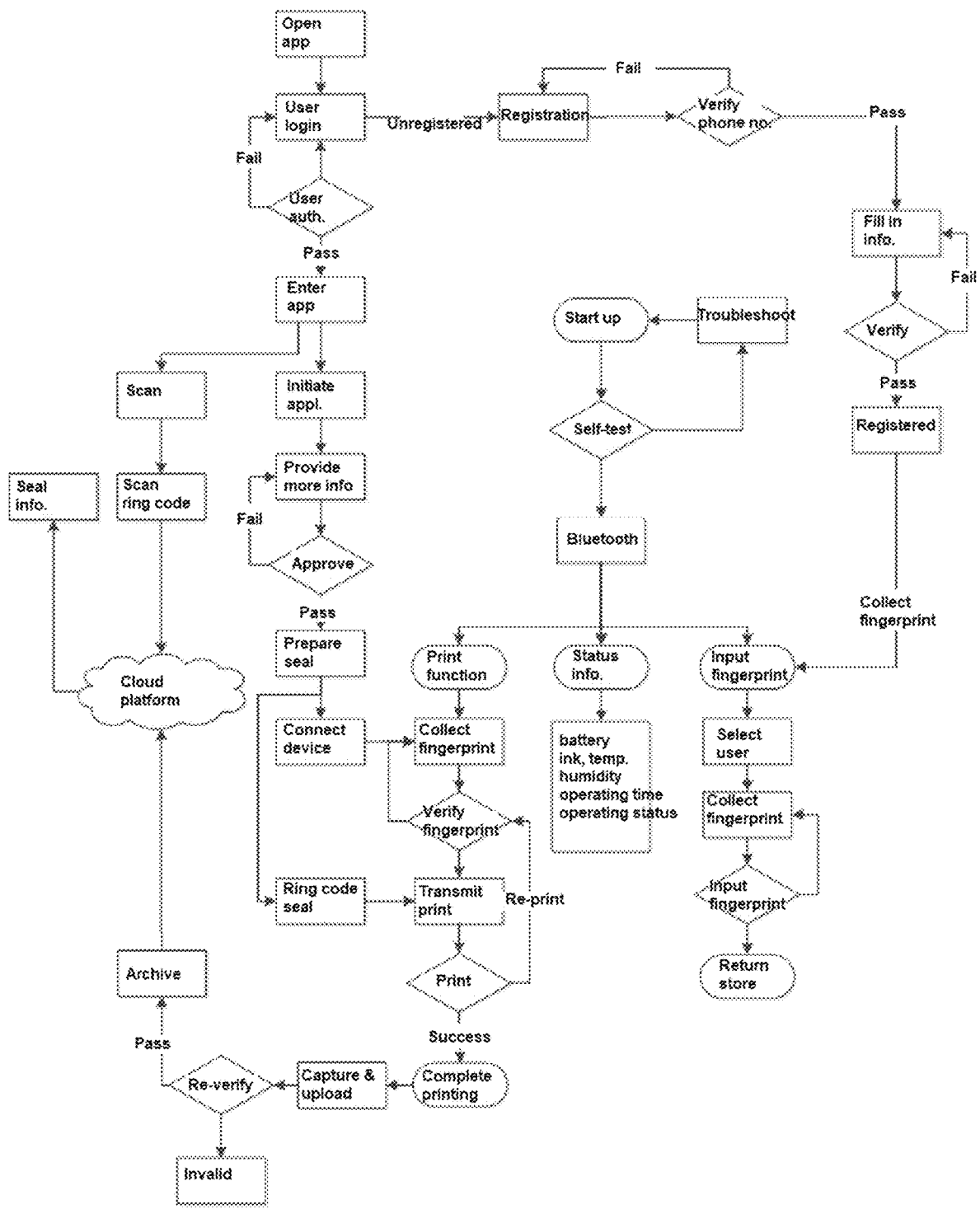
FIG. 2 is a flow chat illustrating using the printing apparatus according to an embodiment of the present disclosure.

FIG. 2 illustrates a method for using the anti-forgery seal printing apparatus according to an embodiment of the present disclosure. The detailed process includes:

First, downloading and opening a seal management program APP on a mobile phone, and inputting user data for user registration. The registration process may include verification of a user mobile phone number, and filling in user personal information on the app when verification is passed. The registration process may also include, for example, when a company account is to be registered on the seal management system, filling in or uploading company information, e.g., company business license, organization code certificate, certificate of identity for a legal representative or a legal representative's signature, and verification of the documents, e.g., by the seal management system connecting to an ICBC (Industrial and Commercial Bank of China) system; when verification is passed, the app notifies that the user is successfully registered.

When a company account is set up for the first time, the seal management system assigns administrator privileges: an administrator can add users under the company account and can set seal using approval authority for users. As a matter of course, a user can add him/her self to the company account by first self-registration and then receiving an approval by the administrator.

When the user has been successfully registered, powering on the portable printer and connecting the portable printer to the mobile phone via Bluetooth upon completion of self-test, troubleshooting, etc. Then a fingerprint is input through the fingerprint recognition module on the portable printer, and the fingerprint information is uploaded to the seal management module for collective management and subsequent user authentication. At this point, user registration is completed.

Figure 3:
FIG. 3 illustrates a mobile app interface for filing a seal using application according to an embodiment of the present disclosure.
Figure 3:
Figure 3:
Figure 3:
Figure 3:
Figure 3:
Figure 3:
Figure 4:
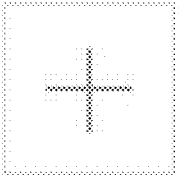
FIG. 4 illustrates a mobile app interface for inputting seal using information according to an embodiment of the present disclosure.
Figure 5:
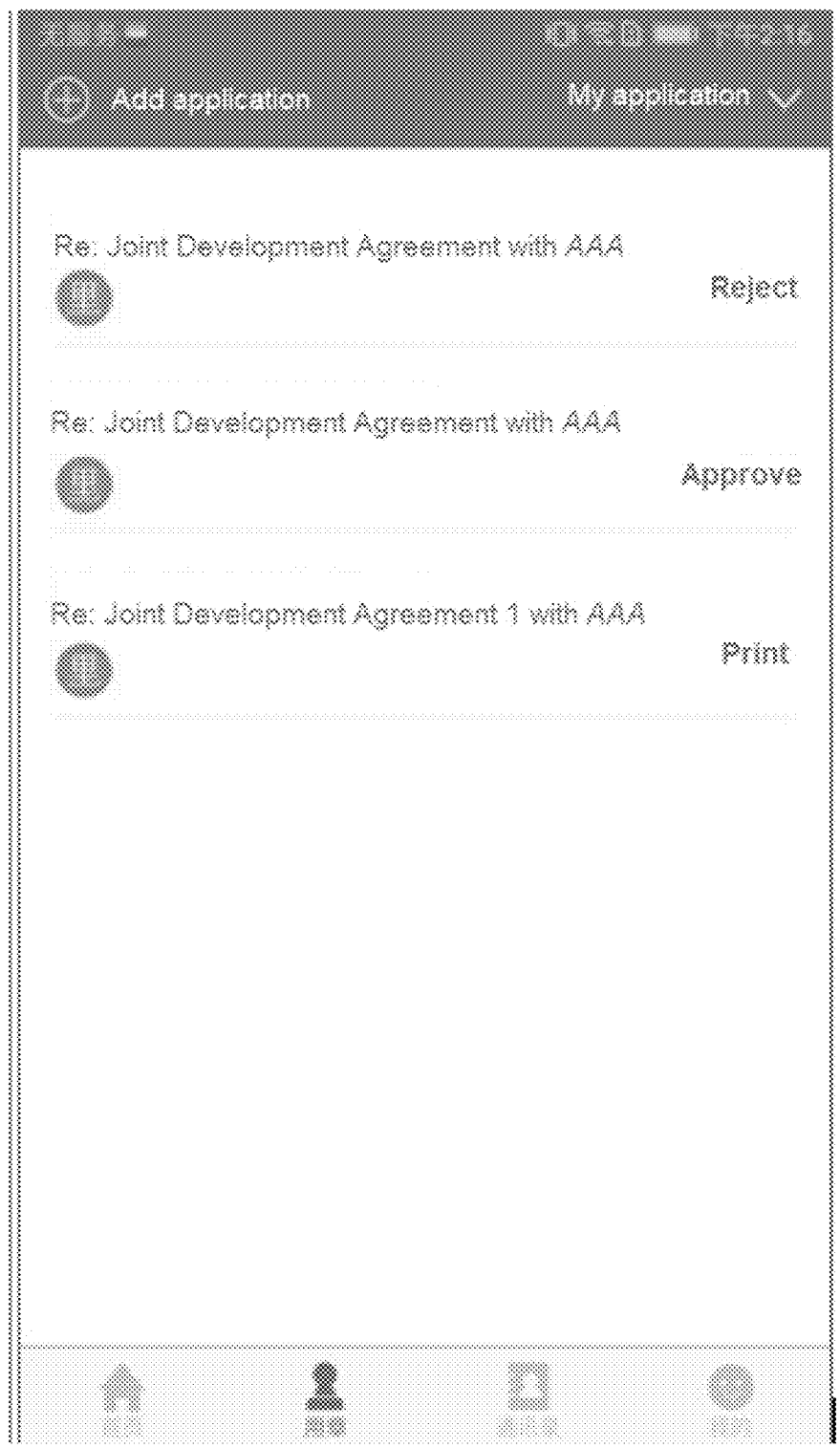
FIG. 5 illustrates a mobile app interface listing a seal using approval process according to an embodiment of the present disclosure.
Figure 6:
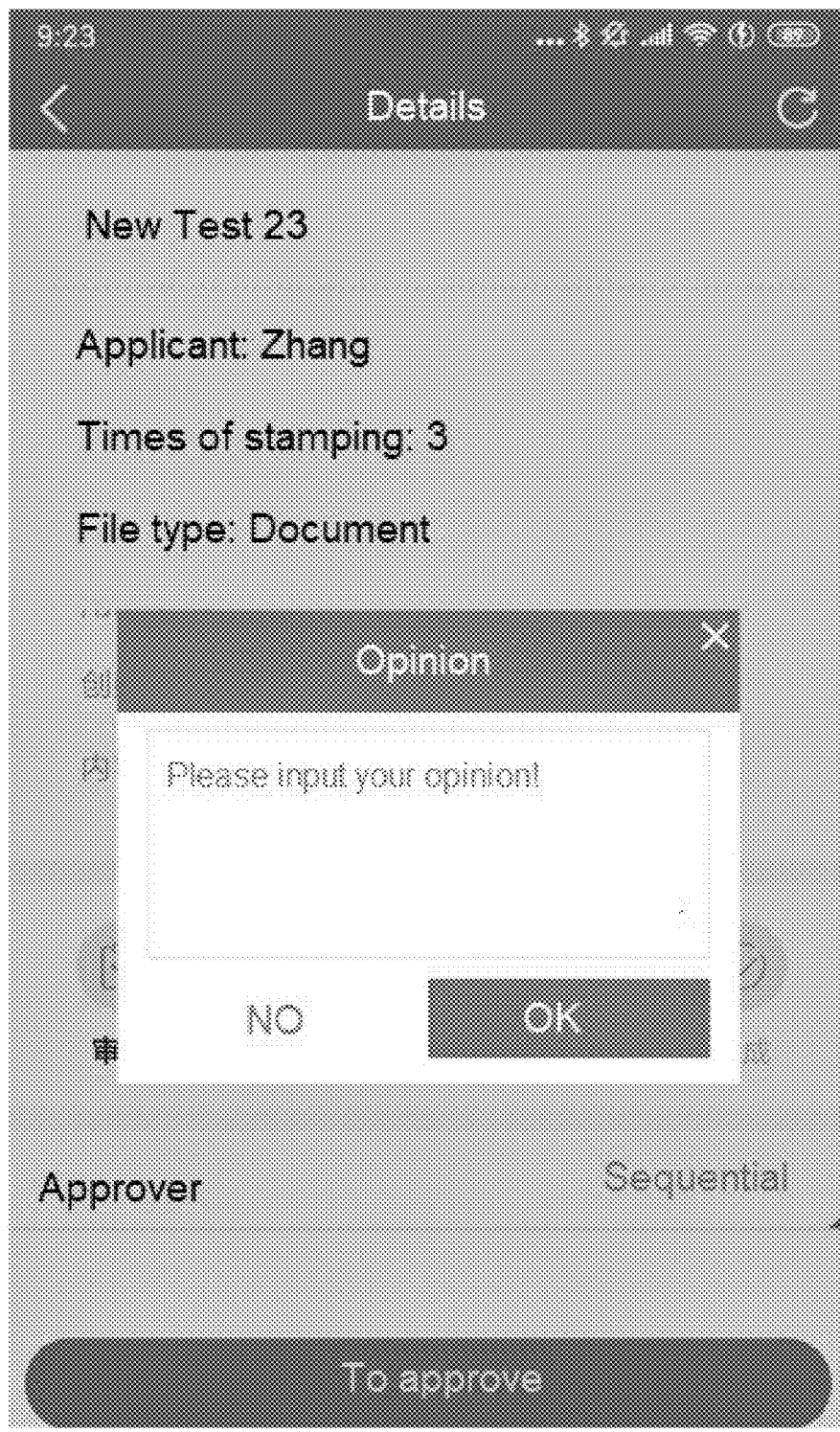
FIG. 6 illustrates a mobile app interface for approving a seal using application according to an embodiment of the present disclosure.

When a seal is to be used, the user opens the mobile app, logs in to the personal account with, e.g., an account password, and initiates a seal using application on the app, as shown in FIG. 3. After a seal using application is initiated, the mobile app may ask the user to provide more seal using information, as shown in FIG. 4; such information may include names of the contracting parties, seal use, contract amount, contract summary and number of seal usage. When more information has been provided, the system enters a seal using approval process as shown in FIG. 5. Upon receipt of the seal using application, an advanced user with approval authority can input approval opinions in an interface as shown in FIG. 6.

Once the seal using application is approved, the seal can be printed at any time by controlling via the mobile APP. The user can carry the seal to a contracting site, and when it is time to sign, the user can take the seal out, power it on and connect it to the mobile phone via Bluetooth. Then, the user can touch the fingerprint verification module of the seal, the fingerprint verification module collects user fingerprint information and transmits it to the seal management platform, which compares stored fingerprint information. When fingerprint verification is passed, the printer in the seal automatically starts and prints the seal.

After printing, the mobile app prompts the user to take a picture of the stamped document and upload the image information to the seal management platform for archiving.

Figure 7:
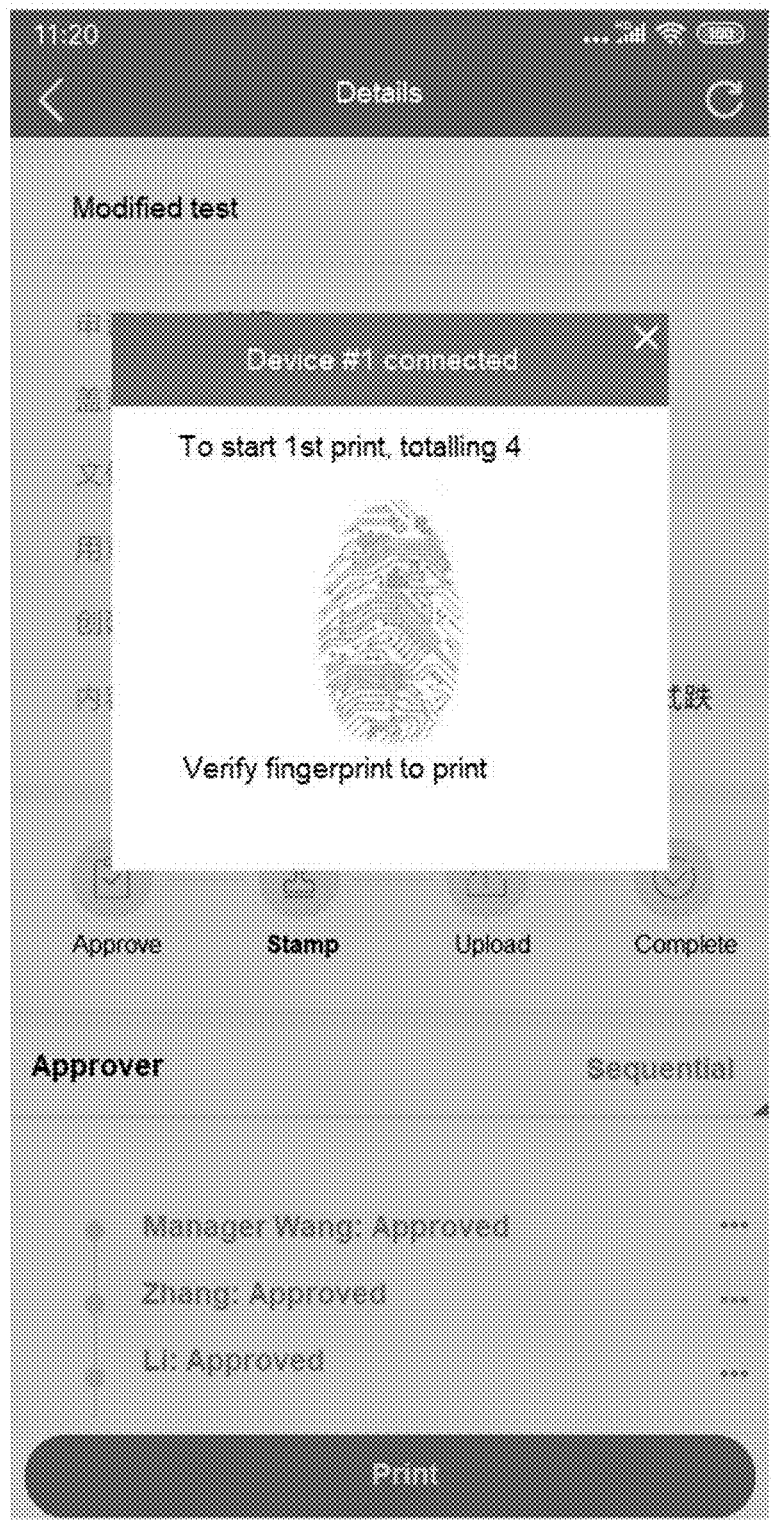
FIG. 7 illustrates a mobile app interface for printing the seal according to an embodiment of the present disclosure.
Figure 8:
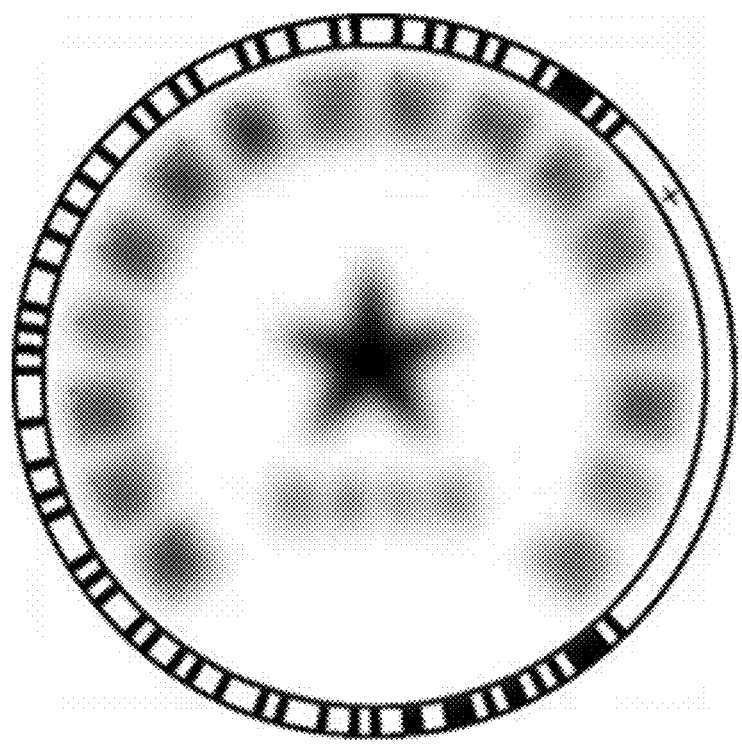
FIG. 8 illustrates an example of a seal with an anti-forgery code according to an embodiment of the present disclosure.

Afterward, if some other user wants to verify the stamped document, he/she can open the mobile phone app, enters a code scanning interface and scans the anti-forgery code of the seal. As shown in FIG. 7, scanned data is transmitted by the mobile phone to the seal management platform; the seal management platform computes and obtains seal information, and transmits it to the mobile phone, which subsequently displays the seal information on an interface. The user can then check the information displayed on the app with the written words on the stamped document, to verify the seal and the stamped document.

A detailed description of the present disclosure is provided above in conjunction with specific preferred embodiments. It is noted that the embodiments described herein are for illustrative purposes only and shall not be construed as liming the scope of the disclosure. Those skilled in the art should understand that modification or equivalents can be made to the technical solutions described herein without deviation from the scope of the present disclosure.

What is claimed is:

1. An apparatus for printing an anti-forgery seal, the anti-forgery seal being a seal with an anti-forgery mark, the apparatus comprising a portable seal, a mobile terminal and a seal management platform, wherein:
   the seal management platform comprises:
   (1) a user data management module, for user registration, managing and storing a user information database, user identity authentication by comparison with the user information database, storing predetermined user approval authority, and assisting user in approving a seal using application by using the predetermined user approval authority;
   (2) a seal image generation module, for generating a seal image and transmitting it to the portable seal for printing in response to a seal using application;
   (3) a seal usage data storage module, for storing data information generated in seal using processes, and for storing image data of the stamped document captured and uploaded by the user; and
   (4) an information retrieval module for displaying a specific part or all the content of the stamped document image in response to a user seal information retrieval request according to different privilege levels of users;
   the portable seal comprises:
   (1) a fingerprint verification module, for activating a printing module of the portable seal to print by verifying a fingerprint;
   (2) a data transmission module, for data transmission between the portable seal and the mobile terminal;
   (3) a printing module, for printing the seal, where the seal is with anti-forgery information;
   the mobile terminal comprises:
   (1) a built-in seal management program, for providing an interface for new user registration, and uploading user identity information and company business information to the seal management platform; and for providing an interface to users of different levels for filing or approving a seal using application;
   (2) a scanner, for scanning a seal with an anti-forgery code, and uploading scanned data to the seal management platform, which computes and obtains seal anti-forgery information.

2. The apparatus according to claim 1, wherein the seal usage data storage module is for storing all seal using application, seal using approval and related time information generated in seal using processes.

3. The apparatus according to claim 1, wherein the seal image generated by the seal image generation module is an anti-forgery seal with an anti-forgery code.

4. The apparatus according to claim 3, wherein the anti-forgery code is an image anti-forgery code on the entire outer edge of a seal, forming a closed loop.

5. The apparatus according to claim 4, wherein the anti-forgery code consists of a plurality of vertical bars of different widths and spacings arranged in a ring structure.

6. The apparatus according to claim 4, wherein the seal is a circular, oval or rectangle seal.

7. The apparatus according to claim 3, wherein the anti-forgery code is an image anti-forgery code on a portion of the outer edge of a seal, forming an unclosed loop.

8. The apparatus according to claim 7, wherein the anti-forgery code consists of a plurality of vertical bars of different widths and spacings arranged in a ring structure.

9. The apparatus according to claim 7, wherein the seal is a circular, oval or rectangle seal.

10. The apparatus according to claim 3, wherein the pattern of the seal anti-forgery code is calculated and obtained with an encryption and anti-forgery algorithm internal to the seal management platform.

11. The apparatus according to claim 1, wherein the seal management platform is a cloud platform and further comprises an anti-forgery information retrieval module, for retrieving seal anti-forgery information through cloud computing by using data obtained by the mobile terminal from scanning the seal anti-forgery code, and displaying the seal anti-forgery information via the mobile terminal.

12. The apparatus according to claim 11, wherein the seal anti-forgery information displayed by the mobile terminal is information related to the seal using action, comprising: contract content, seal user, seal use approver, seal stamping time and seal stamping location; the seal anti-forgery information displayed by the mobile terminal is compared with the stamped document, to verify the seal and the stamped document.

13. The apparatus according to claim 1, wherein the fingerprint verification module collects user fingerprint information during new user registration, and uploads the user fingerprint information to the seal management platform for storage and management.

14. The apparatus according to claim 1, wherein the printing module comprises a rotational-printing integrated ink cartridge, the integrated ink cartridge comprises a cartridge body and a printer nozzle on the cartridge body, the cartridge rotates about its own axis to realize the printing of the seal.

15. The apparatus according to claim 14, wherein the printer nozzle is a thermal foam spray nozzle.

16. The apparatus according to claim 14, wherein the printer nozzle uses a security anti-forgery ink.

17. The apparatus according to claim 14, wherein the printing module further comprises a printer nozzle moisturizing and cleaning mechanism.

18. The apparatus according to claim 17, wherein the printer nozzle moisturizing mechanism is a silicone pad, which is pressed against the nozzle when the nozzle is idle, so that the inside of the nozzle is insulated from the air to prevent the ink from solidifying.

19. The apparatus according to claim 17, wherein the printer nozzle cleaning mechanism controls based on the power so that all of the injection holes simultaneously enter a maximum power injection state to achieve cleaning effect.

20. The apparatus according to claim 14, wherein the rotational-printing integrated ink cartridge is a cylindrical ink cartridge.

21. The apparatus according to claim 1, wherein the specific part of the stamped document is a document image with contract amount blurred out, or a document image of only names of the contracting parties and/or a contracting date.

22. The apparatus according to claim 1, wherein the portable seal further comprises a laser pointer module, for indicating a stamping location for the seal, which corresponds to the location of the printer nozzle.

23. The apparatus according to claim 22, wherein the laser pointer module comprises a laser head positioned at an angle with the paper, so that the farther away the portable seal is from the paper, the larger the box formed by the light is, and that the closer the portable seal is to the paper, the smaller the box formed by the light is.

24. The apparatus according to claim 1, wherein the scanner is a camera with scanning capability.

25. The apparatus according to claim 1, wherein the mobile terminal is any one or more of: mobile phone, PAD, PC, laptop and remote controller.

26. The apparatus according to claim 1, wherein the data transmission provided by the data transmission module of the portal seal is encrypted.

27. The apparatus according to claim 1, wherein the seal management platform and the mobile terminal are connected via any one or more of: WiFi, Bluetooth, LAN and Coaxial cable; the mobile terminal and the portable seal are connected via any one or more of: WiFi, Bluetooth, LAN and Coaxial cable.

28. A method for using the apparatus according to claim 1, the method comprising the following steps in a sequential order:
   (1) inputting user information and company business information to the seal management platform by using a built-in seal management program on the mobile terminal or directly using a computer, to complete user registration after verification;
   (2) entering fingerprint information by using the fingerprint recognition module on the portable seal, and uploading the fingerprint information to the seal management platform;
   (3) assigning, by the seal management platform according to a predetermined rule, administrator privileges to one or more users, such that the user with administrator privileges can set seal approval authority for other users of the same company;
   (4) when it is time to stamp a seal, opening the seal management program, and initiating a seal using application after verification is passed, where the initiating a seal using application comprises filling in seal using-related information in the seal management program;
   (5) after the seal using application is initiated, approving, level-by-level, by users with different seal approval authorities preset by the administrator, the seal using application, by using the seal management program;
   (6) once the seal using application is approved, performing two-way data transmission between the mobile terminal and the portable seal;
   (7) uploading fingerprint information collected by the fingerprint verification module on the portable seal to the seal management platform for verification, and automatically activating by the portable seal the printing function immediately after the verification is passed.

29. The method according to claim 28, wherein the method further comprises: after the seal is printed, capturing the stamped document by a camera on the mobile terminal, and uploading to the seal management platform, which stores the image information.

30. The method according to claim 29, wherein the unchangeable log file is a real-time generated file, i.e., the unchangeable log file is generated immediately after an information item related to the stamping process is collected.

31. The method according to claim 29, wherein the captured image information is stored to an unchangeable log file.

32. The method according to claim 28, wherein the predetermined rule in step (3) comprises assigning the first user that creates the company account administrator privileges.

33. The method according to claim 28, wherein the verification in step (1) comprises verification of company business information and identity for a legal representative, and the verification is done automatically at the seal management platform or manually.

34. The method according to claim 28, wherein the seal using-related information filled in step (4) comprises any one or more of: user account, names of contracting parties, seal use, contract amount, contract summary and number of seal usage.

35. The method according to claim 28, wherein the level-by-level approval in step (5) comprises: approving, by users according to their different seal approval authorities set by the administrator in step (3) from the one with the lowest authority to the one with the highest authority.

36. The method according to claim 28, wherein the method further comprises, after the fingerprint verification is passed in step (7) and before the portable seal prints the seal: transmitting, by the seal management platform, seal image information to be printed to the printer body.

37. The method according to claim 28, wherein after each one of steps (1) to (7), the seal management platform records a log file generated in the corresponding step, where the log file is an unchangeable file and records information related to the stamping process, including user and company registration information in respective steps, user fingerprint information, time information of the seal using application, approval process information and content of the stamped contract.

* * * * *